March 12, 1946.  J. B. GONZALEZ  2,396,322
SAFETY MATCH SPLITTING DEVICE
Filed Dec. 6, 1943     5 Sheets-Sheet 1
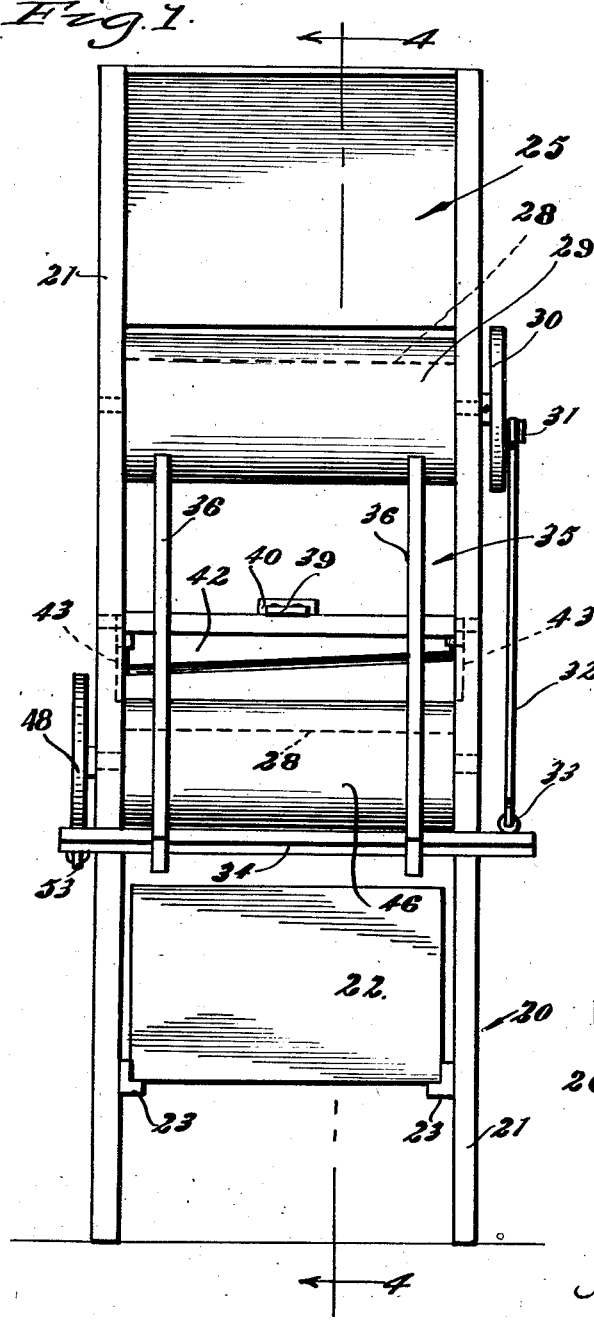
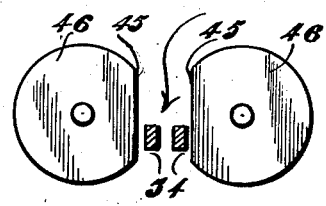
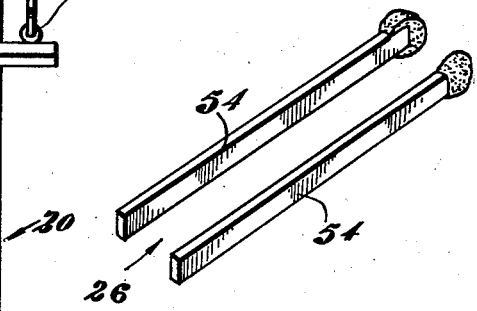
Inventor
JUAN B. GONZALEZ
By Clarence A. O'Brien
and Harvey B. Jackson
Attorneys

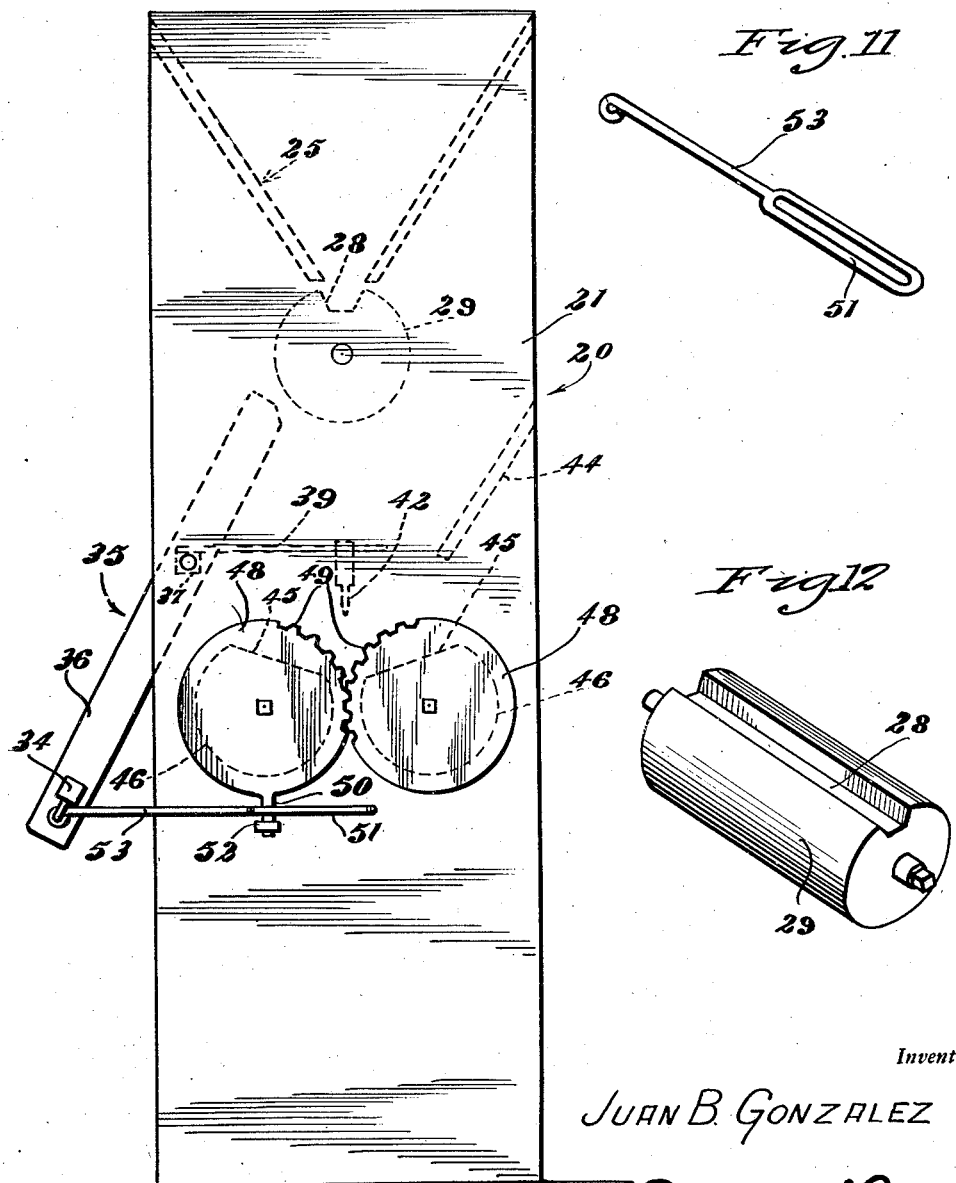

March 12, 1946. J. B. GONZALEZ 2,396,322
SAFETY MATCH SPLITTING DEVICE
Filed Dec. 6, 1943 5 Sheets-Sheet 3
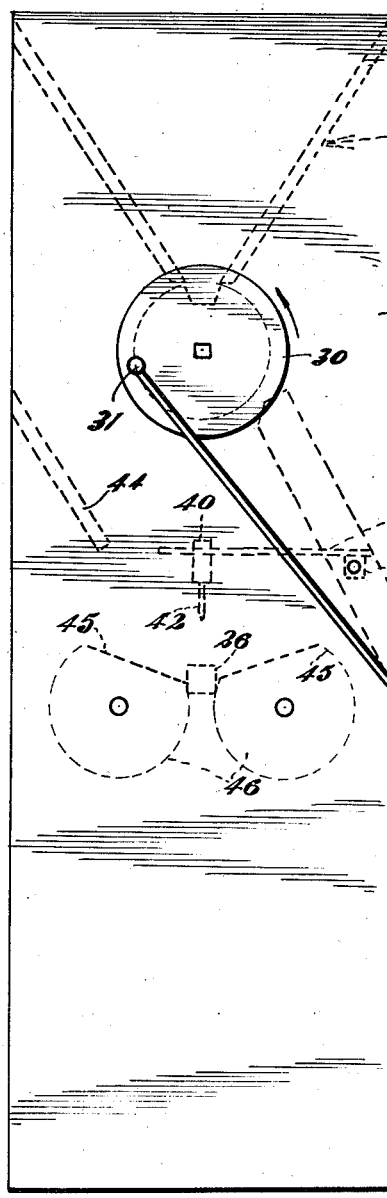
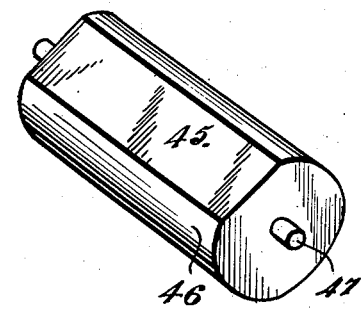
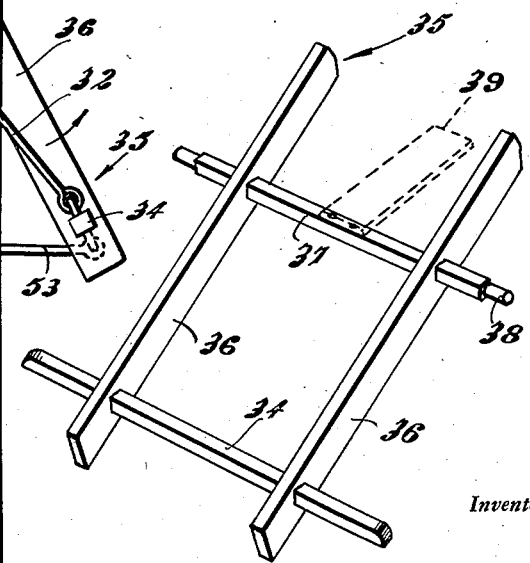
Inventor
JUAN B. GONZALEZ
By Clarence A. O'Brien
and Harvey B. Jacobson
Attorneys March 12, 1946. J. B. GONZALEZ 2,396,322
SAFETY MATCH SPLITTING DEVICE
Filed Dec. 6, 1943 5 Sheets-Sheet 4
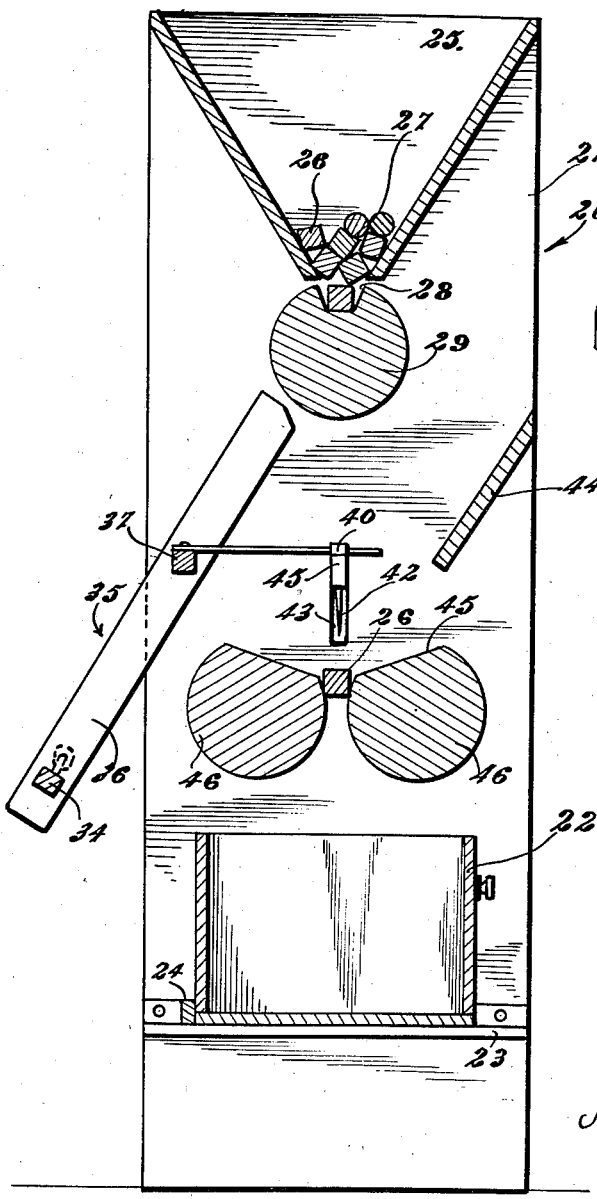
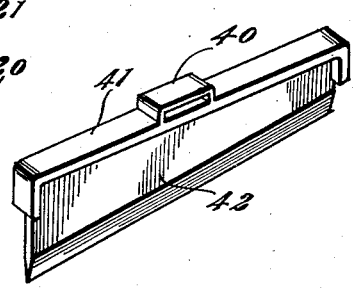
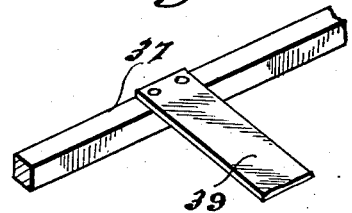
Inventor
JUAN B. GONZALEZ
By Clarence A. O'Brien
and Harvey B. Jacobson
Attorneys

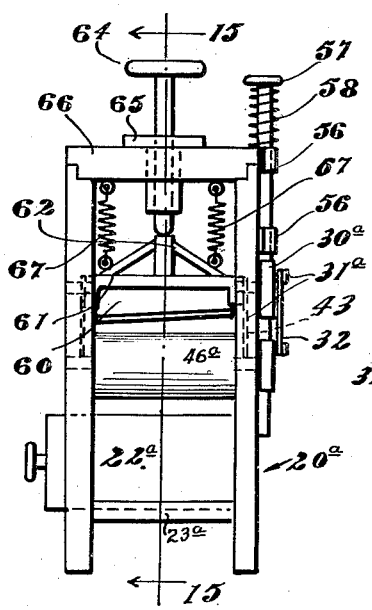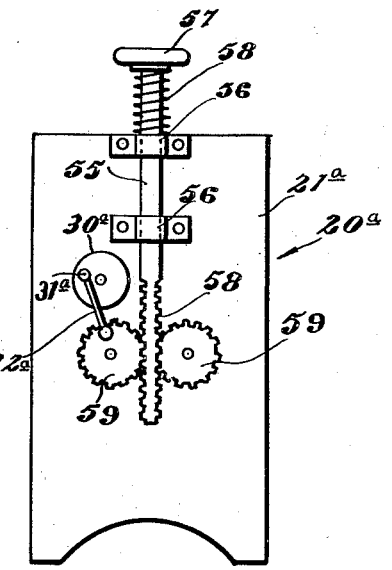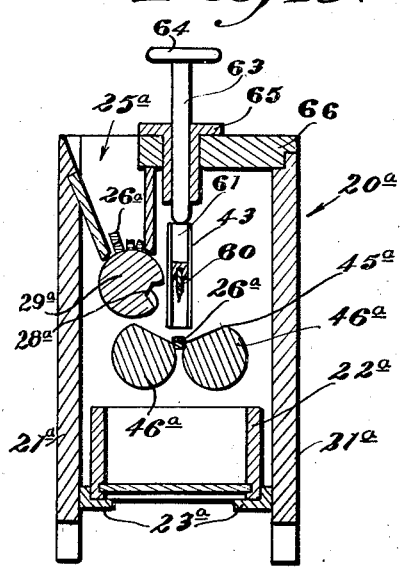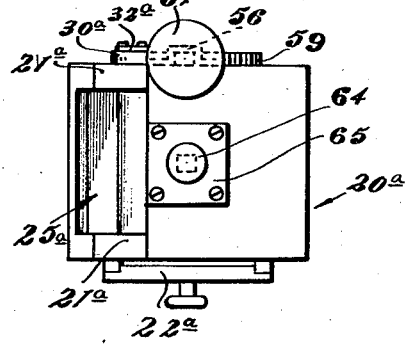

Patented Mar. 12, 1946

2,396,322

UNITED STATES PATENT OFFICE 2,396,322

SAFETY MATCH SPLITTING DEVICE

Juan B. González, Lares, P. R.

Application December 6, 1943, Serial No. 513,185

8 Claims. (Cl. 144—50)

This invention relates to what is believed to be a new and novel ways and means of handling present-day safety match shortage problems, the primary results desired being achieved through the adoption and use of a machine or device which is expressly constructed for splitting safety matches into duplicate half-sections, the latter being usable as self-sufficient matches.

As implied in the preceding opening statement, of the invention, priorities restrictions, and materials conservation programs and measures have culminated in an acute shortage of match supplies in certain areas. Confronted not only with retail price problems arising out of this situation and other collateral and attending problems such as shipping, storage and the like, I have found it expedient and practicable to provide especially constructed match splitting machines and devices such as may be individually or otherwise used, whereby to make it possible to practically make two boxes of matches out of each one as now sold on the market. It is, therefore, my primary aim to work for and succeed in measures making these results possible and to accomplish the same through the instrumentality of feasible and expedient structural means.

In carrying out the underlying principles of my aims I have found it expedient and practicable to provide a pair of parallel oscillatory anvil-like rollers or members, these to hold the match momentarily in a position to accommodate the downward guillotine movement of the cutting knife, the latter being positioned above said rollers and beneath the associated hopper structure which feeds and delivers the matches one-by-one into the temporary resting position on the anvils for splitting.

I aim also to provide a structural arrangement in the category stated which is characterized by a relative simplicity and expediency as regards the choice and structural organization of parts, the final arrangement being sturdily designed and otherwise devised to aptly accomplish the results desired.

Other features and advantages will become more readily apparent from the following description and the accompanying illustrative drawings.

In the drawings, wherein like numerals are employed to designate like parts throughout the views:

Figure 1 is an elevational view of one embodiment or form of the invention, this constructed in accordance with my ideas and possessing the features and arrangements above generally referred to.

Figure 2 is a side elevation of the structure seen in Figure 1 observing the same in a direction from left to right.

Figure 3 is a similar side elevational view, this depicting the opposite side of the structure, that is, as it is seen in Figure 1 in a direction from right to left.

Figure 4 is a central vertical sectional view on the plane of the line 4—4 of Figure 1.

Figure 5 is a perspective view of one of the anvil surfaced rollers.

Figure 6 is a perspective detail of the rockably mounted handle-equipped operating frame.

Figure 7 is a view showing the position of the flat-faced anvils on the rollers in the positions assumed when the split match sections pass therebetween into the collecting drawer or box.

Figure 8 is a perspective view of the final product, that is, the split match sections.

Figure 9 is a perspective view of the knife and its frame.

Figure 10 is a perspective view of the knife actuating spring.

Figure 11 is a perspective view of the frame actuated roller operating link.

Figure 12 is a perspective view of the individual match receiving and dumping roller.

Figure 13 is an elevational view on a reduced scale showing a modified form or construction of match splitting machine.

Figure 14 is a side elevation of Figure 13 observing the parts in a direction right to left.

Figure 15 is a central vertical sectional view, this on the line 15—15 of Figure 13.

Figure 16 is a top plan view of Figures 13 and 14.

A general survey of the drawings will show that two embodiments of the invention are disclosed therein. That is to say, an alternative form of the invention is seen in Figures 13 to 16, inclusive. Fundamentally, however, both forms of the invention embody common characteristics such as will be alluded to in the succeeding description.

Reference will first be had to the form of the invention and its parts disclosed in Figures 1 to 12, inclusive. Here we see a suitable support or frame structure 20 characterized by spaced parallel uprights or frame members 21. Between the lower ends a receiving drawer 22 is slidable on appropriate ledges 23, the innermost position of the drawer being determined by a stop cleat 24. At the top, that is, the position between the upper portions of the frame members 21 is a suitable hopper 25, this to accommodate the whole matches. Some of the matches are cubical in cross section as indicated at 26 and others cylindrical as at 27. However, they are all wood matches and have so-called safety ignitable heads. The matches drop through the discharge slot in the hopper and into a receiving pocket 28 in the receiving and dumping roller 29. This is horizontally disposed between the frame members and underneath the hopper slot and is mounted for oscillation in appropriate bearings. On one end there is an operating disk 30 provided with an eccentric pin 31 to accommodate a push-pull rod 32. The rod is connected by an eye 33 to the horizontal handle member 34 in the frame unit 35. This unit (see Figure 6) comprises vertically disposed parallel frame-pieces 36 connected to the handle member 34 and also connected to a rocker shaft 37. This shaft has journals 38 on opposite ends, said journals being oscillated in bearings in the main frame structure. The rocker shaft 37 is also provided with a flat spring, that is, a leaf spring 39, which has its free end mounted in an eye 40 on the frame back 41 of the beveled match splitting knife or blade 42. This frame operates up and down in guide slots 43 as brought out in Figure 4.

The matches are dumped by the roller 29 against a deflector chute 44 (see Figure 4) on to the flat anvil faces 45 of the splitting rollers 46. These rollers are provided with trunnions or journals 47 mounted for oscillation in appropriate bearings in the frame structure. The journals on the left hand ends of the structure, as brought out to advantage in Figures 1 and 3, are provided with coacting motion imparting disks 48. The disks, in turn, are provided with segmental gear teeth 49 in mesh as shown to advantage in Figure 2. One disk is provided with a lug 50, this being extended through a link 51 and assembled in place by retaining nuts 52. The link as brought out to advantage in Figures 2 and 11 is on a reciprocatory actuating rod 53, said rod being appropriately connected to one end of the frame handle 34. Thus, the horizontal reciprocating operating rod 53 has operating eccentric connection with the adjacent disk 48. This is on one side of the machine. On the opposite side the eccentric 32 is in effect a pitman and is arranged to provide a suitable operating connection between the handle 34 and its eccentrically associated disk 30 (see Figure 1).

In the arrangement shown and described the hopper 25 is charged with suitable conventional wood stick matches 26 and 27. The matches drop one by one into the receiving pocket 28 of the valving and dumping roller 29. Assuming then that the device is charged for operation as brought out in Figure 4 the pocket 28 is then beneath the discharge opening at the lower end of the hopper 25. By grasping the handle 34 on the operating frame unit 35 and rocking said frame in an upward direction it is evident that the rod or pitman 32 imparts oscillation to the valving and dumping roller 29. The roller thus dumps the deposited match against the deflector chute 44 and closes the discharge end of the hopper. At the predetermined successive interval of time, the spring, that is, the flat spring 39, comes into play, this to shove the frame 41 down. This, in turn, carries the knife 42 against the match which has been deposited on and slightly between the anvil surfaces of the splitter rollers or members 46. The splitting operation is accomplished and the rollers 46 are turned to dump the split sections 54 (see Figures 7 and 8) between the turning rollers 46 and into the receiving drawer or box 22. The parts are properly constructed and arranged and timed to produce this progressive and sequential series of coordinated steps.

Reference being had now to the modification seen in Figures 13 to 16, inclusive, it will be observed that the frame structure is also denoted by the numeral 20a and this includes uprights 21a. It further embodies guide tracks or rails 23a for the trap drawer 22a. In this arrangement the hopper 25 is toward the left, that is, at the top and to one side as shown in Figure 15, this to accommodate the matches 26a to be split. The valving and dumping roller, which is mounted for oscillation, is indicated also by the numeral 29a and is provided with a pocket 28a. This particular part is shown in its valving position as indicated in Figure 15. The splitter rollers are indicated by the numerals 46a, these being disposed in spaced parallel oscillatory positions and having flat anvil faces 45a.

This modified arrangement also includes an operating disk 30a on one end of the dumping roller 29a, this provided with an eccentric pin 31a to accommodate a push-pull rod 32a. The latter is seen in Figure 14 as connected eccentrically with one of the pinions 59.

Attention is now directed to the operating devices for the splitter rollers 46a. Referring in particular to Figure 14, it will be seen that a plunger rod 55 operates through appropriate guide brackets 56 on one of the uprights or side walls. It is provided at its top with a hand piece 57 and is returned to its uppermost "ready" position by a coiled spring 58. The lower end is fashioned into a double rack 58 which is engageable with gears or pinions 59 provided on adjacent journal-ends of the rollers 46a. The aforementioned pitman 32 (see Figure 13) which is eccentrically connected with the actuated disk 30a is, in turn, connected with the adjacent pinion 59. Thus the rack and pinion means serves to operate the valving and dumping match roller 29a and the anvil splitter rollers or members 46a. The parts are so constructed and arranged to accomplish this in the desired timed relation.

In this modified arrangement it is necessary to provide two operating devices instead of the one frame arrangement already described. It will be noticed in Figure 13, for example, that the knife 60 is mounted in a frame 61 slidably mounted in guides in the uprights 21. This frame 61 is provided with an end thrust pin 62 aligned with the stem 63 of the palm plunger 64. The plunger 64 is mounted in an appropriate guide fixture 65 in the top 66. The plunger 63 engages the end thrust abutment or pin 62 and this forces the frame 61 and knife down against the match to split the match into half sections. Coiled springs 67 connect with the top 66 and with the frame 61 to lift and normally return the frame to its ineffective position as disclosed for example in Figure 13.

By comparing the two forms of the invention and especially the respective operating devices it will be observed that in the arrangement disclosed in Figures 1 to 12, a single operating frame 35 accomplishes the desired result. That is to say, this one frame properly controls the rest of the parts which, in turn, come into play in proper sequential order to take the match from the hopper, and place it in position on the anvils and split it into half sections. In the modification disclosed in Figures 13 to 16, this arrangement requires two movements, one to place the match in the match holding and splitting rollers and to at the same time set the split match free, the second movement to split the match by executing a soft and quick push on the plunger and blade frame arrangement. Experience will accustom one to handling the two plungers in exactly the desired timed relationships.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a match splitter of the class described, a support, a pair of rollers mounted for oscillation on said support, corresponding surface portions of said rollers being rounded to form match folding anvil elements and flattened to provide match clearing portions, means for holding the rollers in a predetermined position to retain the match momentarily in a position to be severed into half sections, said means also serving to oscillate said rollers to drop the match sections into a suitable underlying receiver, guide means on said support, a knife mounted for reciprocation in said guide means, said knife being disposed in a position to split the held match into half sections, and means for operating the knife.

2. In a match splitter of the class described, a support, a pair of rollers mounted for oscillation on said support, corresponding surface portions of said rollers being rounded to form match folding anvil elements and flattened to provide match clearing portions, means for holding the rollers in a predetermined position to retain the match momentarily in a position to be severed into half sections, said means also serving to oscillate said rollers to drop the match sections into a suitable underlying receiver, guide means on said support, a knife mounted for reciprocation in said guide means, said knife being disposed in a position to split the held match into half sections, means for operating the knife, a hopper for holding matches disposed on said support, and a valving and dumping pocketed roller also on the support coacting with the discharge portion of said hopper.

3. In a structure of the class described, a support embodying parallel uprights, a split match receiving drawer slidably mounted on said support, a pair of rollers mounted for oscillation in parallel spaced relation between the uprights and directly above said drawer and having means to support a match to be split and to discharge the match after being split, guide means, a knife mounted for reciprocation in said guide means to split the match, means for operating the knife, a hopper above said rollers, an individual pocketed valving and dumping roller beneath the discharge end of said hopper.

4. In a structure of the class described, a support embodying parallel uprights, a split match receiving drawer slidably mounted on said support, a pair of rollers mounted for oscillation in parallel spaced relation between the uprights and directly above said drawer and having means to support a match to be split and to discharge the match after being split, guide means, a knife mounted for reciprocation in said guide means to split the match, means for operating the knife, a hopper above said rollers, an individual pocketed valving and dumping roller beneath the discharge end of said hopper, and a deflector to one side of said valving and dumping roller for casting the individual matches into proper position against the anvil elements in the manner and for the purposes described.

5. In a structure of the class described, a frame structure, match receiving and holding members mounted for operation thereon, match supply and delivering means also on said support, a knife, a frame for said knife, guide means on said support for accommodating said frame, a hand grasped and rocked operating frame mounted for oscillation on said frame structure and including a handle and a rocker shaft, said rocker shaft being provided with a projecting flat spring and said flat spring being connected at its free end with the frame of said knife, said match holding member being provided with meshing gears, and a reciprocating operating member between one of said gears and the manually rocked operating frame.

6. In a match splitter of the class described, a frame structure including a pair of uprights, a pair of horizontally disposed match supporting splitter rollers mounted for oscillation between said uprights and including flat faced coacting portions to discharge a split match, pinions on corresponding ends of said rollers, a vertical reciprocatory plunger including a rack engageable with said pinions, and a splitter knife to split a match on the rollers and operating means for said knife.

7. In a match splitter of the class described, a frame structure including a pair of uprights, a pair of horizontally disposed match supporting splitter rollers mounted for oscillation between said uprights and including flat faced coacting portions to discharge a split match, pinions on corresponding ends of said rollers, a vertical reciprocatory plunger including a rack engageable with said pinions, and a splitter knife to split a match on the rollers and operating means for said knife, together with a hopper in said frame structure and a pocketed valving and dumping roller coacting with the discharge end of said hopper.

8. In a match splitter of the class described, a support including a pair of uprights, a pair of match supporting rollers mounted for oscillation between said uprights, said rollers serving to hold the match while being split and then releasing and discharging the thus split half-sections, a plunger slidably mounted in guides on one of said uprights, intermeshing pinions mounted on corresponding ends of said rollers, said plunger being provided with parallel racks interposed between and engaging said pinions, a hopper, a slotted valving roller coacting with the discharge end of said hopper and adapted to supply single matches step-by-step from the hopper to said match supporting rollers, a disk on the outer end of said valving roller, an eccentric operating connection between said disk and one of said pinions, a knife slidable between said uprights, return springs for said knife, and a separate plunger for exerting downward thrust movements to said knife in the manner and for the purposes described.

JUAN B. GONZÁLEZ.